United States Patent
Herndon et al.

(10) Patent No.: US 7,224,552 B2
(45) Date of Patent: May 29, 2007

(54) HIGH-SPEED CENTRIFUGAL SEAL FOR A SPINDLE MOTOR

(75) Inventors: Troy M. Herndon, San Jose, CA (US); Jeffry A. LeBlanc, Aptos, CA (US); Robert A. Nottingham, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 438 days.

(21) Appl. No.: 10/852,983

(22) Filed: May 24, 2004

(65) Prior Publication Data

US 2005/0015791 A1   Jan. 20, 2005

Related U.S. Application Data

(60) Provisional application No. 60/488,226, filed on Jul. 16, 2003.

(51) Int. Cl.
*G11B 17/08* (2006.01)
*H02K 5/16* (2006.01)
*F16C 32/06* (2006.01)

(52) U.S. Cl. .................. 360/98.08; 384/107; 310/67 R (58) Field of Classification Search ............. 360/98.08
See application file for complete search history.

(56) References Cited

U.S. PATENT DOCUMENTS 5,524,986 A * 6/1996 Leuthold et al. ............ 384/119
6,181,039 B1 * 1/2001 Kennedy et al. ............ 310/90
6,655,841 B1 * 12/2003 Heine et al. ................ 384/110
6,900,568 B2 * 5/2005 LeBlanc et al. ............ 310/90
7,133,250 B2 * 11/2006 Herndon et al. ......... 360/99.08
2004/0008910 A1 * 1/2004 Oelsch ....................... 384/100
2004/0247213 A1 * 12/2004 Dittmer et al. ............. 384/132

* cited by examiner

*Primary Examiner*—Brian E. Miller
(74) *Attorney, Agent, or Firm*—Wax Law Group (57) ABSTRACT

A robust spindle motor is provided having added shock resistance for fluid containment. In an aspect, a high-speed centrifugal capillary seal contains a fluid reservoir extending between similarly rotatable components. Fluid is recirculated through the motor and substantially around a counterplate. Proper axial positioning of motor components and stiffness is maintained in motors supporting heavy loads such as a disk drive memory system having a weighty disc pack. In an aspect, two separate thrust surfaces provide oppositely directed axial forces acting on motor components. In an aspect, a single thrust plate that is comparatively small is utilized, reducing power consumption. Also, a thrust bearing situated inboard of a capillary seal forms a comparatively small diameter thrust plate gap. The comparatively small diameter thrust plate gap increases efficiency and characteristics including surface flatness, run out and perpendicularity are improved.

17 Claims, 6 Drawing Sheets

HIGH-SPEED CENTRIFUGAL SEAL FOR A SPINDLE MOTOR

CROSS REFERENCE TO RELATED APPLICATION

This application is based on a provisional application 60/488,226, filed Jul. 16, 2003, attorney docket number STL 3416.01, entitled Rotating Counterplate And Shield For Centrifugal Sealing, and assigned to the Assignee of this application and incorporated herein by reference.

FIELD OF THE INVENTION

The invention relates generally to spindle motors, and more particularly to a high-speed capillary seal wherein fluid circulates around a counterplate for a hydrodynamic fluid bearing for use with a heavy load disc drive data storage system.

BACKGROUND OF THE INVENTION

Disc drive memory systems are being utilized in progressively more environments, and design and performance needs have intensified including improved robustness and reduced power consumption. Besides traditional computing environments, disc drive memory systems are used more recently by devices including digital cameras, digital video recorders, laser printers, photo copiers, jukeboxes, video games and personal music players. Disc drive memory systems store digital information that is recorded on concentric tracks of a magnetic disc medium. Several discs are rotatably mounted on a spindle, and the information, which can be stored in the form of magnetic transitions within the discs, is accessed using read/write heads or transducers. A drive controller is conventionally used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor is known as an in-hub or in-spindle motor, which typically has a spindle mounted by means of a bearing system to a motor shaft disposed in the center of the hub. The bearings permit rotational movement between the shaft and the sleeve, while maintaining alignment of the spindle to the shaft. The read/write heads must be accurately aligned with the storage tracks on the disc to ensure the proper reading and writing of information.

Spindle motors have in the past used conventional ball bearings between the sleeve and the shaft. However, the demand for increased storage capacity and smaller disc drives has led to the design of higher recording area density such that the read/write heads are placed increasingly closer to the disc surface. A slight wobble or run-out in disc rotation can cause the disc to strike the read/write head, possibly damaging the disc drive and resulting in loss of data. Conventional ball bearings exhibit shortcomings in regard to these concerns. Imperfections in the raceways and ball bearing spheres result in vibrations. Also, resistance to mechanical shock and vibration is poor in the case of ball bearings, because of low damping. Vibrations and mechanical shock can result in misalignment between data tracks and the read/write transducer. These shortcomings limit the data track density and overall performance of the disc drive system. Because this rotational accuracy cannot be achieved using ball bearings, disc drives currently utilize a spindle motor having fluid dynamic bearings between a shaft and sleeve to support a hub and the disc for rotation. One alternative bearing design is a hydrodynamic bearing.

In a hydrodynamic bearing, a lubricating fluid such as gas or liquid or air provides a bearing surface between a fixed member and a rotating member of the disc drive. Hydrodynamic bearings eliminate mechanical contact vibration problems experienced by ball bearing systems. Further, hydrodynamic bearings can be scaled to smaller sizes whereas ball bearings have smallness limitations. However, hydrodynamic bearings suffer from sensitivity to external loads or mechanical shock. Fluid can in some cases be jarred out of the bearing by vibration or shock events. Further, bearing fluids can give off vaporous components that could diffuse into a disc chamber. This vapor can transport particles such as material abraded from bearings or other components. These particles can deposit on the read/write heads and the surfaces of the discs, causing damage to the discs and the read/write heads as they pass over the discs.

Effective sealing is critical in the case of hydrodynamic bearings, and efforts have been made to address these concerns. A capillary seal is typically employed to ensure fluid is maintained within a bearing. Here, a fluid meniscus is formed between two component walls and capillary attraction retains the fluid. Recent designs employ a radial capillary seal having diverging walls wherein the diverging walls form an enlarged fluid reservoir for fluid lost due to evaporation. Further, in a reservoir having larger volume, lower viscosity oil may be used, lowering power loss due to viscous friction. However, with a larger reservoir having diverging walls, the capillary seal gap is widened and thus the oil retention capability is lowered. Moreover, although a radial capillary provides some shock resistance, its shock resistance is limited and fluid can be dislodged from a reservoir.

Mobile applications require higher resilience to shock events than desktop or enterprise products. Laptop or portable computers can be subjected to large magnitudes of mechanical shock as a result of handling. Also, as motors become shorter due to a trend to reduce axial height, the spacing between bearing components decreases, minimizing the angular or rocking stiffness of the bearings. It has become essential in the industry to design disc drives having smaller dimensions, motor stability and capable of withstanding substantial mechanical shock, while maintaining reduced power consumption. Additionally, since motors are being designed having reduced power consumption, maintaining proper axial positioning of motor components is made increasingly difficult. This is especially a concern for motors that support a heavy load such as a large disc pack.

SUMMARY OF THE INVENTION

The present invention provides a stable spindle motor having improved robustness and added shock resistance. A high-speed centrifugal capillary seal retains fluid wherein the strength of the centrifugal seal is maximized. A fluid reservoir is positioned between rotatable components and therefore the fluid in the fluid reservoir also rotates at a maximized speed. The invention also provides for fluid recirculation wherein fluid is recirculated through a fluid recirculation passageway, through the motor and substantially around a counterplate.

The present invention is further directed to reduce power consumption. A single thrust plate that is comparatively small is utilized, reducing power consumption. Also, a comparatively small diameter thrust plate gap is formed. A gain in efficiency is realized and characteristics including surface flatness, run out and perpendicularity are improved. Further, although power consumption is reduced, the present invention is particularly useful for spindle motors supporting a heavy load such as a disc drive having a disc pack and a plurality of discs.

Features of the invention are achieved in part by utilizing a top cover attach design. The shaft is made more rigid, which adds stability to the entire motor. Further, a high-speed centrifugal capillary seal is provided by forming a centrifugal capillary seal meniscus extending from a rotatable shield to a rotatable counterplate when the motor is rotating.

The present invention employs a thrust bearing that is inboard of a capillary seal. Further, an enlarged fluid reservoir is positioned between the counterplate and shield. The present invention employs a novel design in that both a comparatively small thrust plate that reduces power consumption and an enlarged fluid reservoir, positioned axially above the counterplate, is provided together. Further, by utilizing a comparatively small thrust plate, a smaller thrust gap is maintained, and surface flatness, run out and perpendicularity are improved.

Two thrust surfaces are provided, a first thrust surface on a first side of the thrust plate adjacent to the counterplate, and a second thrust surface on a second side of the thrust plate adjacent to the sleeve. The first thrust surface provides a thrust force in a direction that generally forces the counterplate and sleeve axially up, and the second thrust surface provides a thrust force in an opposite direction that generally forces the sleeve axially down. These thrust forces maintain proper axial positioning of the motor components and also maintain motor axial stiffness.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A system and method is described herein for providing a robust spindle motor having added shock resistance for fluid containment and improved power consumption. The present invention is further useful for maintaining proper axial positioning of motor components in motors supporting heavy loads such as a disk drive memory system having a weighty disc pack.

It will be apparent that features of the discussion and claims may be utilized with disc drives, low profile disc drive memory systems, spindle motors, various fluid dynamic bearing designs including hydrodynamic and hydrostatic bearings, and other motors employing a stationary and a rotatable component. Further, embodiments of the present invention may be employed with a fixed shaft and a rotating shaft. Also, as used herein, the terms "axially" or "axial direction" refers to a direction along a centerline axis length of the shaft (i.e., along axis 230 of shaft 210 shown in FIG. 2), and "radially" or "radial direction" refers to a direction perpendicular to the centerline length of the shaft.

Figure 1:
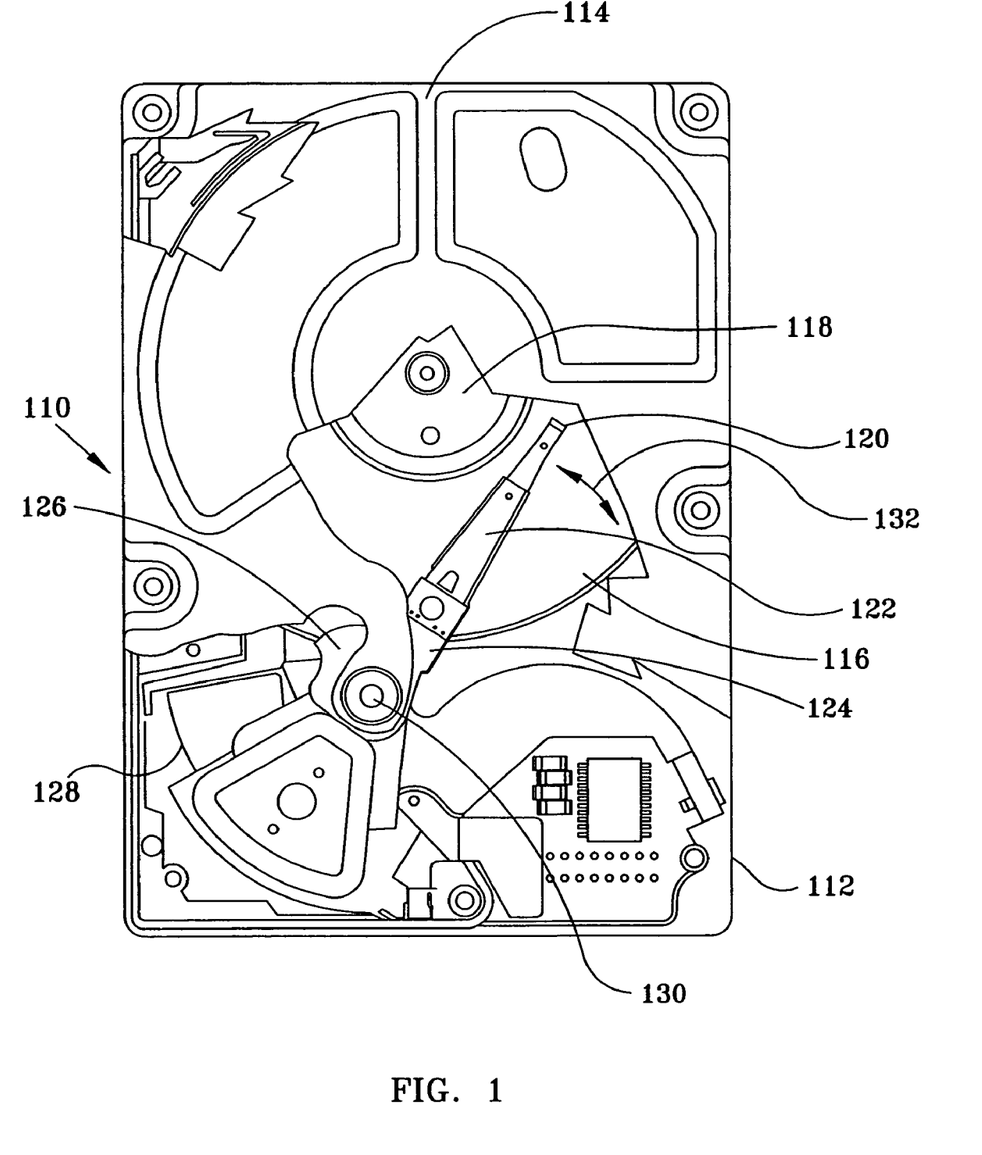
FIG. 1 is a top plain view of a disc drive data storage system in which the present invention is useful, in an embodiment of the present invention.

Referring to the drawings wherein identical reference numerals denote the same elements throughout the various views, FIG. 1 illustrates a typical disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
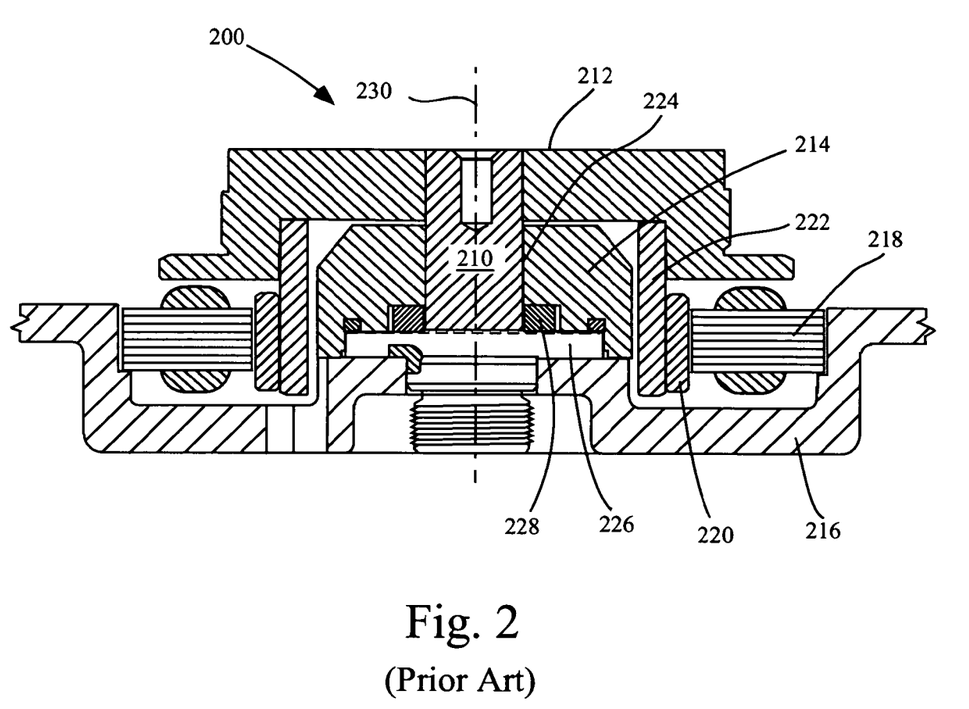
FIG. 2 is a sectional side view of a previously known hydrodynamic bearing spindle motor used in a disc drive data storage system.

FIG. 2 is a sectional side view of a previously known hydrodynamic bearing spindle motor 200 used in disc drives 110. Typically, spindle motor 200 includes a stationary component and a rotatable component. The rotatable components include shaft 210, thrust plate 228, and hub 212. Shaft 210 and hub 212 additionally are affixed to backiron 222 and magnet 220, backiron 222 mounted to an end of shaft 210. The stationary components include sleeve 214, counterplate 226 and stator 218, which are affixed to base 216. Rotating shaft 210 rotates within sleeve 214 having a bore. Sleeve 214 cooperates with an integral, single piece threaded counterplate 226 to define the bearing gap 224 within which shaft 210 rotates. Counterplate 226 cooperates with surfaces of thrust plate 228 to establish a fluid dynamic thrust bearing that supports shaft 210 for relative rotation. A fluid dynamic journal bearing is established in the gap or chamber 224 between the sleeve 214 and the rotating shaft 210 and the thrust plate 228 supported on the shaft 210. The shaft 210 and thrust plate 228 are supported for rotation by fluid between the surfaces of the shaft 210 and thrust plate 228, and the corresponding inner surfaces of the sleeve 214 and the threaded counterplate 226. These surfaces have patterns of grooves thereon to establish appropriate pressures in the fluid and support the shaft 210 for rotation.

As illustrated, fluid contacts one axial side of counterplate 226, specifically, the axial side adjacent to thrust plate 228. In comparison, as detailed below, the present invention provides for circulation substantially around a counterplate.

Figure 3:
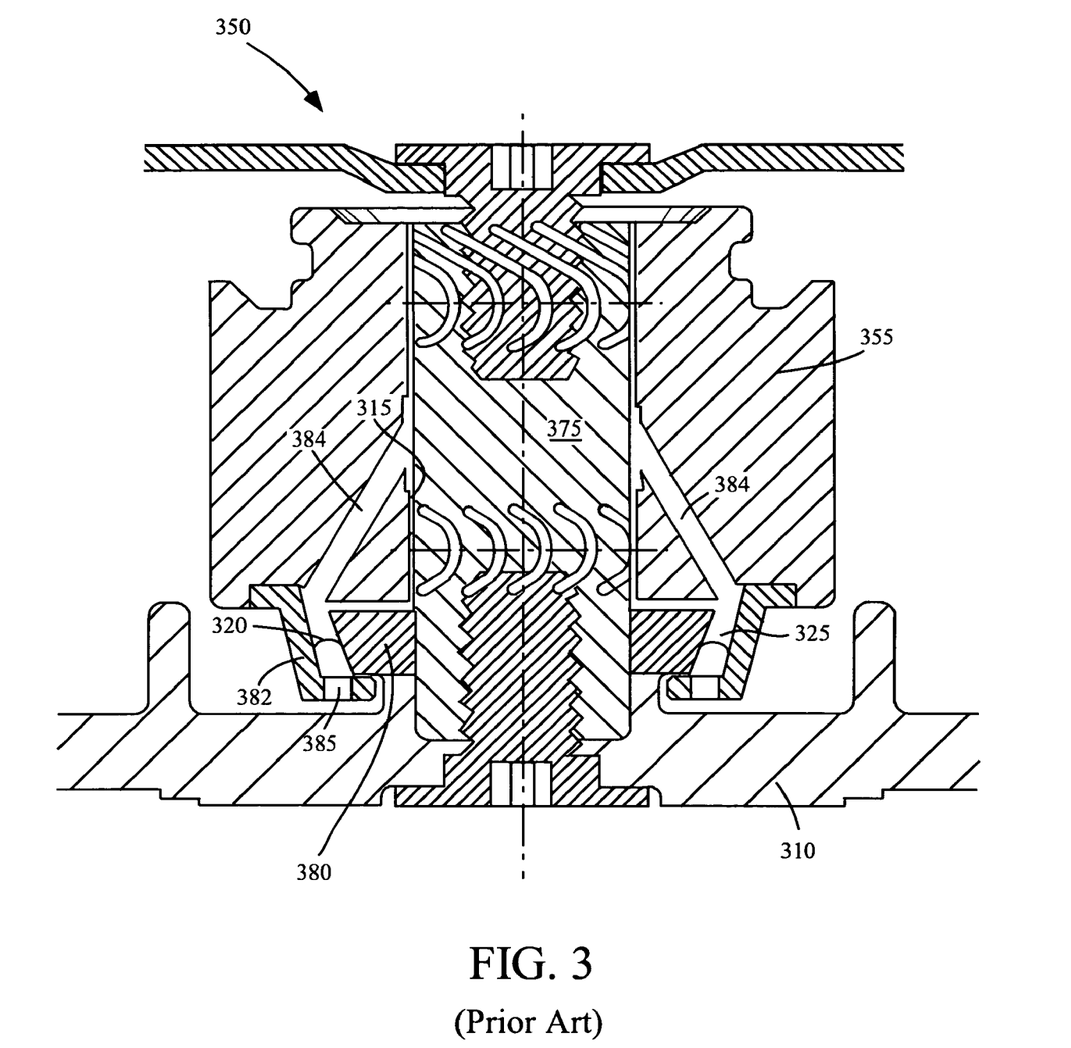
FIG. 3 is a sectional side view of another previously known hydrodynamic bearing spindle motor used in a disc drive data storage system, illustrating a fluid dynamic bearing utilizing a previously known X-seal.

Another previously known motor design that is also used in disc drives 110 is shown in FIG. 3. Spindle motor 350 is an example of a fluid dynamic bearing utilizing a previously known X-seal. Spindle motor 350 employs a stationary shaft 375 and affixed thrust plate 380. Shaft 375 is also affixed to stationary base 310. Sleeve 355 forms a journal gap 315 with shaft 375. A fluid recirculation path 384 circulates fluid passed shield 382 and thrust plate 380. Fluid capillary seal 320 is formed between surfaces of shield 382 and thrust plate 380. Gap 325 maintains fluid (about 0.5 mg of fluid) in part by way of capillary seal 320. Fluid is initially delivered to spindle motor 350 through fill hole 385. A counterplate is absent from spindle motor 350.

As may be observed, capillary seal 320 is formed between a rotatable component shield 382 and a stationary component thrust plate 380. The velocity of any fluid situated adjacent to capillary seal 320 is affected by the relative rotational movement of surfaces of shield 382 and thrust plate 380. Thus, the strength of capillary seal 320 is likewise affected by the relative rotational movement of surfaces of shield 382 and thrust plate 380. In comparison, as detailed below, the present invention provides for a high speed capillary seal formed between two components that rotate at the same velocity.

In a further previously known spindle motor design (not shown) having a rotatable shaft and a stationary sleeve, a radial capillary seal is formed between two stationary components, namely a stationary shield and the stationary sleeve. The capillary seals of the discussed previously known designs exhibit a capillary seal strength that is less than embodiments of the present invention.

Figure 4:
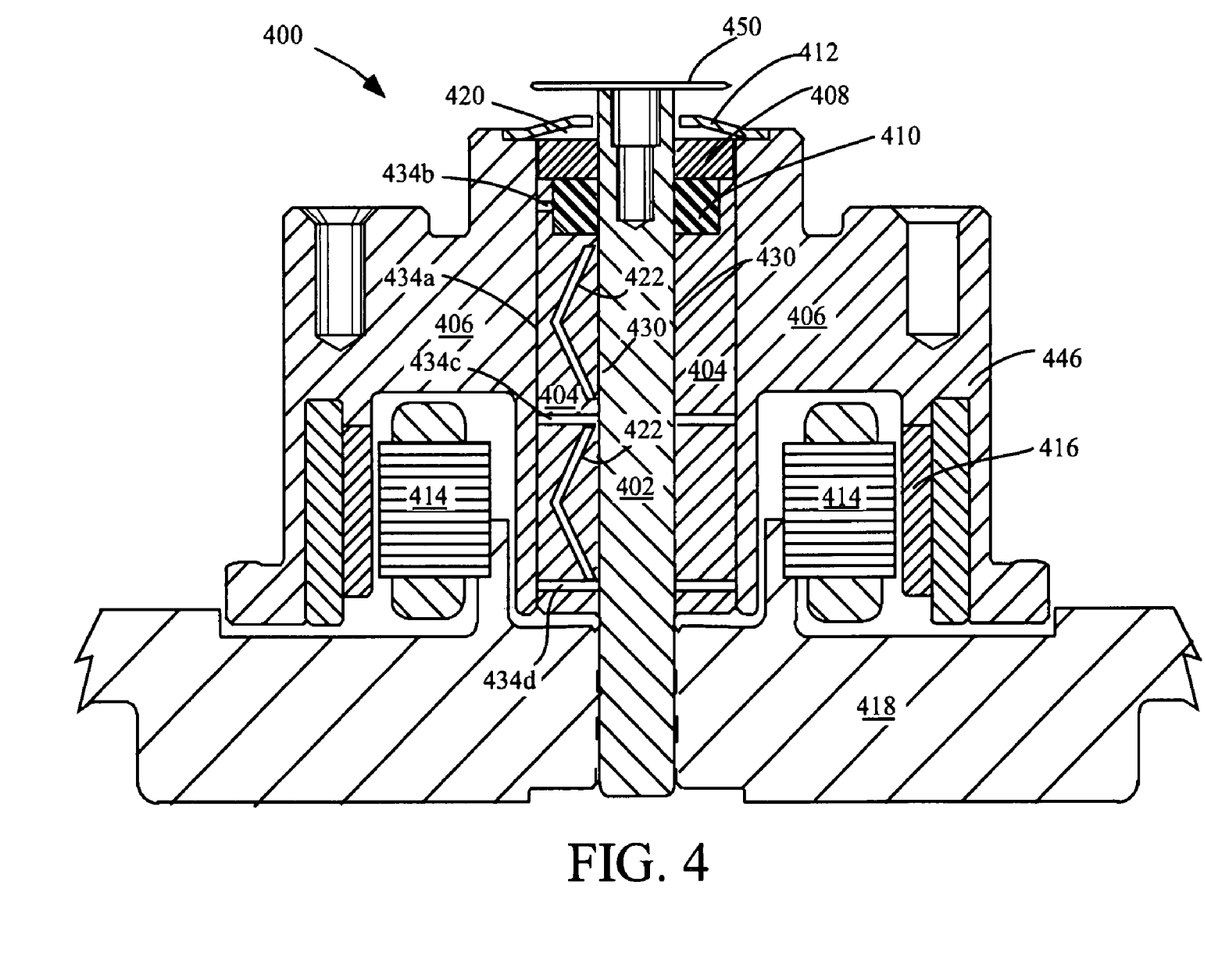
FIG. 4 is a sectional side view of a hydrodynamic bearing spindle motor that can be used in a disc drive data storage system, in an embodiment of the present invention.

Referring to FIG. 4, a sectional side view of a hydrodynamic bearing spindle motor in an embodiment of the present invention is shown. Hydrodynamic bearing spindle motor 400 can be utilized in disc drives 110. Again, the present invention is not limited to use with a hydrodynamic spindle motor design of a disc drive, which is shown only for purposes of the example. Spindle motor 400 includes a stationary component and a relatively rotatable component, defining a journal gap 430 therebetween. The stationary component includes shaft 402 that is fixed and attached to base 418. In an embodiment, shaft 402 is attached to top cover 450, providing rigidity and stability to shaft 402 and improving motor dynamic performance. Thus, in a fixed shaft motor, both upper and lower ends of shaft 402 can be fastened so that the stiffness and stability of the motor and its resistance to shock as well as its alignment to the rest of the system is enhanced.

The rotatable components include sleeve 404 and hub 406 having one or more magnets 416 attached to a periphery thereof The magnets 416 interact with a stator winding 414 attached to the base 418 to cause the hub 406 to rotate. Magnet 416 can be formed as a unitary, annular ring or can be formed of a plurality of individual magnets that are spaced about the periphery of hub 406. Magnet 416 is magnetized to form one or more magnetic poles.

The hub 406 is positioned for rotation about shaft 402, situated adjacent to shaft 402 across journal bearing 430. The counterplate 408 is press fitted to, welded or otherwise supported by sleeve 404, and the thrust plate 410 is affixed to shaft 402. Thrust plate 410 can be an integral part of the shaft 402, or it can be a separate piece that is attached to the shaft, for example, by a press fit. Hub 406 includes a disc carrier member 446, which supports disc pack 116 (shown in FIG. 1) for rotation about shaft 402. Disc pack 116 is held on disc carrier member 446 by disc clamp 118. Additionally, shield 412 is radially self-aligned into hub 406 and attached to hub 406 (i.e., laser welded). A constant gap in the range of 0.025 millimeters to 0.150 millimeters is formed between shield 412 and shaft 402.

A fluid, such as lubricating oil or a ferromagnetic fluid fills interfacial regions between shaft 402 and sleeve 404, thrust plate 410 and sleeve 404, thrust plate 410 and counterplate 408, and between shield 412 and counterplate 408. Although the present figure is described herein with a lubricating fluid, those skilled in the art will appreciate that a lubricating gas can be used.

A fluid reservoir 420 is formed between shield 412 and counterplate 408. A maximum gap in the range of 0.1 millimeters to 0.5 millimeters is formed between shield 412 and counterplate 408. Further, fluid reservoir 420 can hold a range of 0.25 mg. to 15 mg.

A through fluid recirculation passageway (including sleeve channels 434a, 434b 434c and 434d) is formed through sleeve 404 to pass and recirculate fluid through journal bearing 430. Sleeve channel 434a is formed axially along the length of sleeve 404 and provides fluid to sleeve channels 434b, 434c and 434d. Sleeve channels 434b, 434c and 434d extend radially toward journal bearing 430. Sleeve channels 434c and 434d directly supply journal bearing 430 with fluid. Although three radial sleeve channels are shown, it is to be appreciated that other numbers of sleeve channels may be employed.

Figure 5:
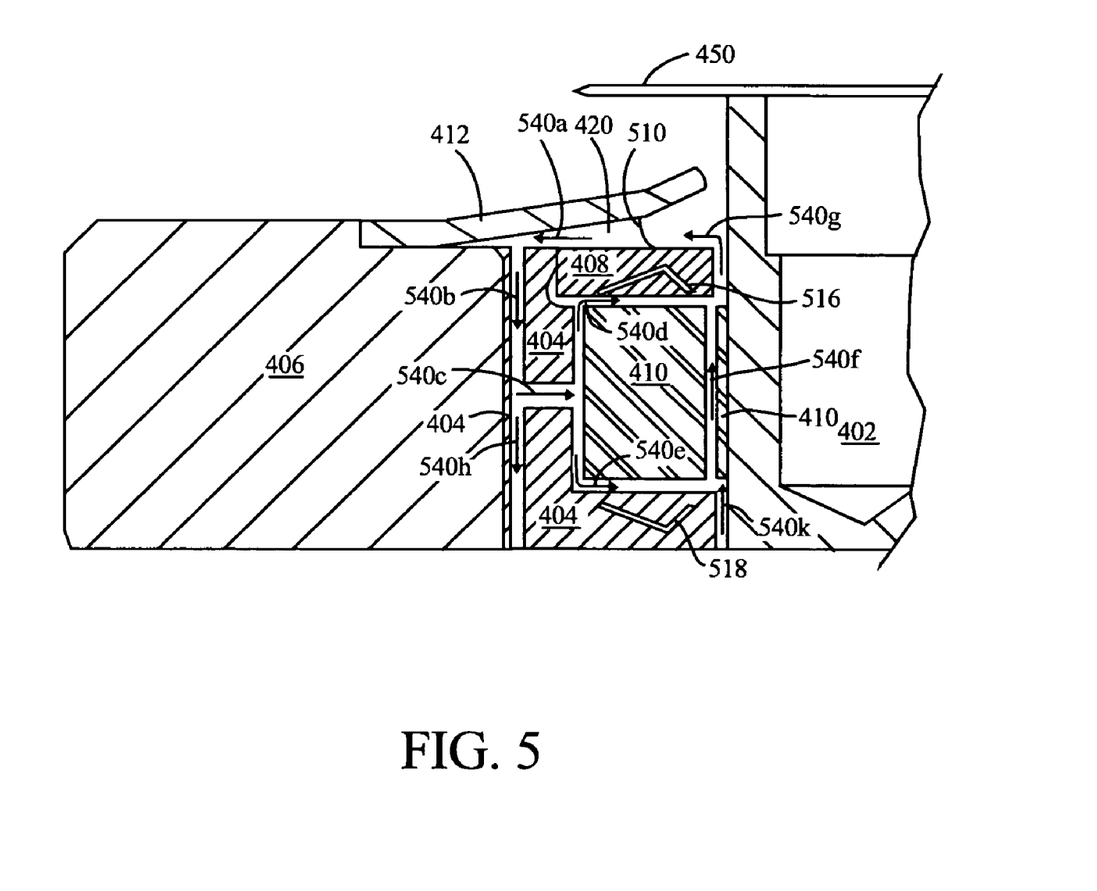
FIG. 5 is another sectional side view of the hydrodynamic bearing spindle motor of FIG. 4 with an enlarged view of the journal illustrating fluid flow, in an embodiment of the present invention.

Referring to FIG. 5, another sectional side view of the hydrodynamic bearing spindle motor of FIG. 4 is shown, with an enlarged view of the journal illustrating fluid flow, in an embodiment of the present invention. In order to promote the flow of fluid over the bearing surfaces, which are defined between the shaft 402 and the sleeve 404, thrust plate 410 and sleeve 404, thrust plate 410 and counterplate 408, generally one of the two opposing surfaces of each such assembly carries sections of pressure generating grooves. Typically, one of shaft 402 and sleeve 404 includes sections of pressure generating grooves, including asymmetric grooves and/or symmetric grooves. Pressure generating grooves 422 shown in FIG. 4 can have a pattern including one of a herringbone pattern and a sinusoidal pattern. Pressure generating grooves 422 induce fluid flow in the interfacial region and generate a localized region of dynamic high pressure and radial stiffness. As sleeve 404 rotates, pressure is built up in each of its grooved regions and shaft 402 supports hub 406 for constant high speed rotation. Additionally, fluid flow encourages air migration and a lower pressure area exists in fluid reservoir 420 such that air is expelled from journal bearing 430 and migrates toward capillary seal 510. Further, grooves 422 positioned on sleeve 404, on the opposite end of sleeve 404 as compared to shield 412, evacuates fluid into the motor toward fluid reservoir 420, thereby retaining fluid situated in the axial end of the journal gap.

In an embodiment, pressure generating grooves are also formed radially on counterplate 408 (groove 516) and sleeve 404 adjacent to thrust plate 410 (groove 518). As discussed below in FIG. 6, these pressure generating grooves also aid in maintaining proper axial positioning of motor components. Grooves 516 and 518 can be formed in the shape of a herringbone pattern, a spiral pattern or other shaped pattern. In an embodiment, in the case of a heavy disc load (greater than a 100 gram load), grooves 516 and 518 are a herringbone pattern to provide more stiffness than a typical spiral pattern.

Fluid is recirculated through the motor and substantially around counterplate 408. By "substantially around" as used herein it is meant fluid flows adjacent to all sides of counterplate 408 along path 540*a*, 540*b*, 540*d* and 540*g*. In an embodiment, fluid contacts all sides of counterplate 408, with the exception of the location that counterplate 408 is affixed to sleeve 404.

Fluid is also circulated around thrust plate 410. Fluid flows along path 540*a*, to path 540*b* through sleeve channel 434*a*. A quantity of fluid continues through path 540*h* while a quantity of fluid flows through path 540*c*. Fluid then flows through both path 540*d* and path 540*e* around thrust plate 410. The fluid flowing through path 540*e* subsequently flows through a thrust plate channel defined by path 540*f*. Path 540*f* also receives fluid from path 540*k* from journal bearing 430. The fluid circulating around thrust plate 410 then flows through path 540*g* (defined between counterplate 408 and shaft 402) to be recirculated into fluid reservoir 420. It is to be appreciated that the other shapes and positioning can be utilized for fluid paths 540*b*, 540*c*, 540*d*, 540*e*, 540*f*, 540*g*, 540*h* and 540*k*. For example, fluid path 540*b* and 540*h* can be formed through hub 406, rather than through sleeve 404.

Conventionally, spindle motors utilize a capillary seal extending between stationary components or between a stationary component and a rotatable component. An example of a capillary seal design extending between a stationary component and a rotatable component is described and shown in FIG. 2 and FIG. 3 as discussed above. The fluid contained by the capillary seal adjacent to the rotatable component moves at a faster velocity or rotations per minute (rpm) than the fluid contained by the capillary seal adjacent to the stationary component. The net effect is that the capillary seal strength is reduced by the slower velocity fluid. That is, the capillary seal strength is affected by the fluid velocity, fluid having a faster velocity providing a stiffer capillary seal. In spindle motors having a fluid reservoir, and especially an enlarged fluid reservoir, a stiff capillary seal design is critical to retaining fluid within the motor.

As compared to the capillary seal designs of FIG. 2 and FIG. 3, in an embodiment the present invention provides a high-speed centrifugal capillary seal. A high-speed centrifugal capillary seal as described herein is defined as a meniscus that extends to similarly rotating components. For example, the fluid meniscus of capillary seal 510 extends from rotating shield 412 to rotating counterplate 408. Fluid reservoir 420 is positioned between similarly rotating components (shield 412 and counterplate 408) and therefore the fluid in the fluid reservoir and the fluid meniscus rotate at a maximized speed. A high-speed centrifugal capillary seal retains fluid with improved strength or stiffness, wherein the strength or stiffness of the fluid meniscus is maximized. In another embodiment of the present invention, capillary seal 510 can extend from shield 412 to either counterplate 408 or shaft 402, depending on factors including the volume of fluid contained, and whether the spindle motor is rotating.

Figure 6:
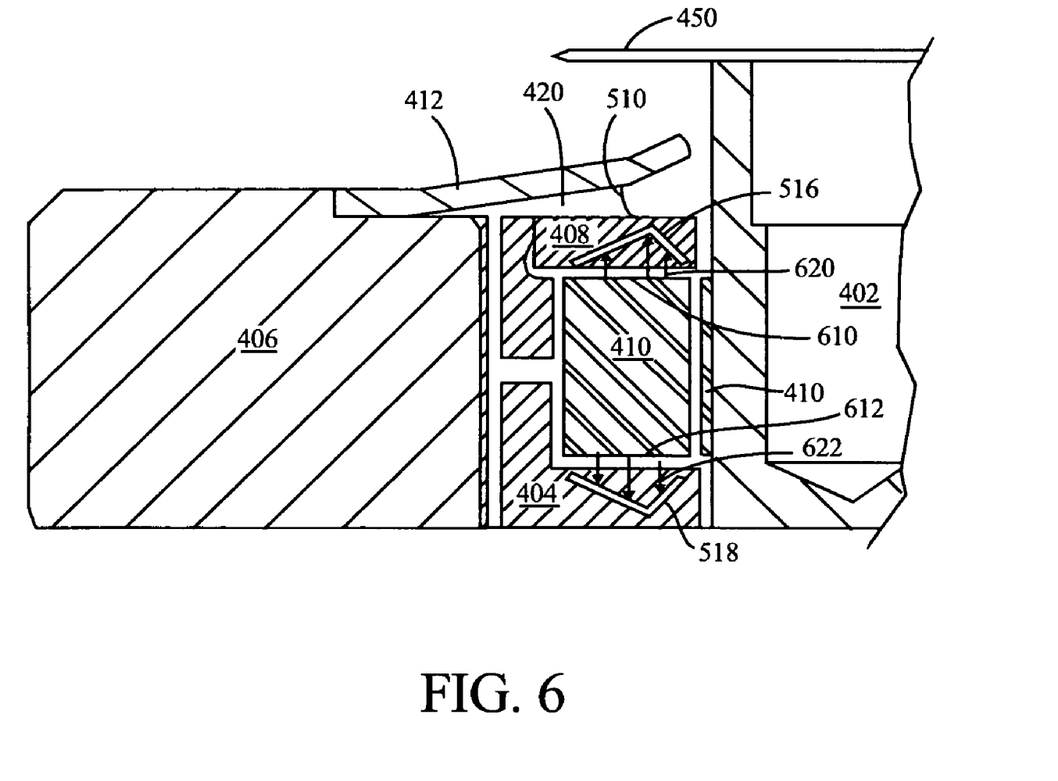
FIG. 6 is another sectional side view of the hydrodynamic bearing spindle motor of FIG. 4 with an enlarged view of the journal illustrating thrust forces, in an embodiment of the present invention.

FIG. 6 shows another sectional side view of the hydrodynamic bearing spindle motor of FIG. 4 with an enlarged view of the journal illustrating thrust forces, in an embodiment of the present invention. In an embodiment, a single thrust plate 410 is affixed to the stationary shaft 402. Thrust plate 410 provides two thrust surfaces, namely a first thrust surface 610 extending substantially radially on a first side of thrust plate 410 adjacent to counterplate 408, and a second thrust surface 612 extending substantially radially on a second side of thrust plate 410 adjacent to sleeve 402. In an embodiment, thrust plate 410 defines a thrust bearing positioned inboard of the capillary seal 510. As described herein, "inboard" means that at least a portion of the thrust bearing, adjacent to thrust surface 610 or thrust surface 612, is radially closer to shaft 402 as compared to capillary seal 510.

Along with pressure generating groove 516, first thrust surface 610 provides a thrust force 620 in a direction that generally forces counterplate 408 and sleeve 404 axially up. Along with pressure generating groove 518, second thrust surface 612 provides a thrust force 622 in an opposite direction that generally forces the sleeve 404 axially down. These thrust forces 620 and 622 maintain proper axial positioning of the motor components and also maintain motor axial stiffness.

In an embodiment, although the present invention can support a heavy disc pack load, and maintain proper axial positioning of motor components, the present invention provides for reduced power consumption. Thrust plate 410 is comparatively small, thus allowing for a comparatively smaller axial gap between thrust plate 410 and counterplate 408, and also between thrust plate 410 and sleeve 404. This smaller axial gap increases the thrust efficiency, thus reducing power consumption. Further, as a result of the smaller thrust axial gap, a gain in motor efficiency is realized since characteristics including thrust plate surface flatness, run out and perpendicularity are improved. In an embodiment, a thrust plate 410 is utilized having a diameter in the range of 2 millimeters to 8 millimeters. In an embodiment, a gap in the range of 0.001 millimeters to 0.015 millimeters is formed between thrust plate 410 and counterplate 408, and between thrust plate 410 and sleeve 404.

Other features and advantages of this invention will be apparent to a person of skill in the art who studies this disclosure. For example, those skilled in the art will appreciate that for heavy loads, in an embodiment, utilizing a single thrust plate and top cover attach design suggests that the spindle motor is actively supported by two thrust surfaces, rather than utilizing EM bias for active support, EM bias support being insufficient in some cases for a heavy disc load. Thus, exemplary embodiments, modifications and variations may be made to the disclosed embodiments while remaining within the spirit and scope of the invention as defined by the appended claims.

We claim:

1. A spindle motor comprising:
   a rotatable component defining a journal bearing and relatively rotatable with a stationary component, the journal bearing containing fluid;
   a counterplate affixed to the rotatable component;
   a shield affixed to the rotatable component;
   a fluid reservoir, extending substantially radially, formed between the counterplate and the shield, wherein the fluid reservoir is contained on an end by a high-speed centrifugal capillary seal formed extending from the shield to the counterplate; and
   a fluid passageway defined through the rotatable component for circulating fluid through the journal bearing, wherein fluid circulates substantially around the counterplate and from a first fluid meniscus side of the centrifugal capillary seal to a second fluid meniscus side of the centrifugal capillary seal, for expelling air from the fluid.

2. The spindle motor as in claim 1, further comprising a single thrust plate having a diameter in the range of 2 millimeters to 8 millimeters affixed to the stationary component, the thrust plate having a first thrust surface extending substantially radially and a second thrust surface extending substantially radially.

3. The spindle motor as in claim 2, wherein the thrust plate defines a thrust bearing positioned inboard of the capillary seal.

4. The spindle motor as in claim 2, wherein the first thrust surface is positioned on a first side of the thrust plate adjacent to the counterplate, and the second thrust surface is positioned on a second side of the thrust plate adjacent to a sleeve, wherein the first thrust surface provides a first thrust force in a direction that forces the counterplate and the sleeve axially up, and the second thrust surface provides a second thrust force in a direction opposite to the first thrust force that forces the sleeve axially down.

5. The spindle motor as in claim 1, wherein the passageway is formed through a sleeve, the sleeve affixed to the rotatable component.

6. The spindle motor as in claim 1, wherein the stationary component is attached to a top cover.

7. A fluid dynamic bearing system comprising:
   a rotatable component defining a journal bearing and relatively rotatable with a stationary component, the journal bearing containing fluid;
   a data storage disc attached to the rotatable component;
   an actuator supporting a head proximate to the data storage disc for communicating with the data storage disc;
   a counterplate affixed to the rotatable component;
   a shield affixed to the rotatable component;
   a fluid reservoir, extending substantially radially, formed between the counterplate and the shield, wherein the fluid reservoir is contained on an end by a high-speed centrifugal capillary seal formed extending from the shield to the counterplate; and
   a fluid passageway defined through the rotatable component for circulating fluid through the journal bearing, wherein fluid circulates substantially around the counterplate and from a first fluid meniscus side of the centrifugal capillary seal to a second fluid meniscus side of the centrifugal capillary seal, for expelling air from the fluid.

8. The fluid dynamic bearing system as in claim 7, further comprising a single thrust plate having a diameter in the range of 2 millimeters to 8 millimeters affixed to the stationary component, the thrust plate having a first thrust surface extending substantially radially and a second thrust surface extending substantially radially.

9. The fluid dynamic bearing system as in claim 8, wherein the thrust plate defines a thrust bearing positioned inboard of the capillary seal.

10. The fluid dynamic bearing system as in claim 8, wherein the first thrust surface is positioned on a first side of the thrust plate adjacent to the counterplate, and the second thrust surface is positioned on a second side of the thrust plate adjacent to a sleeve, wherein the first thrust surface provides a first thrust force in a direction that forces the counterplate and the sleeve axially up, and the second thrust surface provides a second thrust force in a direction opposite to the first thrust force that forces the sleeve axially down.

11. The fluid dynamic bearing system as in claim 7 wherein the passageway is formed through a sleeve, the sleeve affixed to the rotatable component.

12. The fluid dynamic bearing system as in claim 7, wherein the stationary component is attached to a top cover.

13. In a spindle motor having a journal bearing defined between a relatively rotatable component and a stationary component, the journal bearing containing fluid, a method comprising:
    attaching a data storage disc to the rotatable component;
    supporting a head with an actuator proximate to the data storage disc for communicating with the data storage disc;
    affixing a counterplate to the rotatable component;
    affixing a shield to the rotatable component;
    forming and extending substantially radially a fluid reservoir between the counterplate and the shield, wherein the fluid reservoir is contained on an end by a high-speed centrifugal capillary seal formed extending from the shield to the counterplate; and
    defining a fluid passageway through the rotatable component for circulating fluid through the journal bearing, wherein fluid circulates substantially around the counterplate and from a first fluid meniscus side of the centrifugal capillary seal to a second fluid meniscus side of the centrifugal capillary seal, for expelling air from the fluid.

14. The method as in claim 13, further comprising utilizing a single thrust plate having a diameter in the range of 2 millimeters to 8 millimeters affixed to the stationary component, the thrust plate having a first thrust surface extending substantially radially and a second thrust surface extending substantially radially.

15. The method as in claim 14, further comprising positioning a thrust bearing inboard of the capillary seal.

16. The method as in claim 14, positioning the first thrust surface on a first side of the thrust plate adjacent to the counterplate, and positioning the second thrust surface on a second side of the thrust plate adjacent to a sleeve, wherein the first thrust surface provides a first thrust force in a direction that forces the counterplate and the sleeve axially up, and the second thrust surface provides a second thrust force in a direction opposite to the first thrust force that forces the sleeve axially down.

17. The method as in claim 13, further comprising forming the passageway through a sleeve, the sleeve affixed to the rotatable component.

* * * * *